United States Patent Office 3,423,165
Patented Jan. 21, 1969

---

3,423,165
STABILIZING KERATINIC FIBERS THROUGH TREATMENT WITH SUBSTANTIALLY NEUTRAL SOLUTIONS OF ALKALI METAL SALTS OF DICHLOROCYANURIC ACID
Claude Trezain, Bouffemont, and Jean Claude Cosnard, Fresnes, France, assignors to Compagnie de Saint-Gobain, Neuilly-sur-Seine, France
No Drawing. Continuation-in-part of application Ser. No. 152,640, Nov. 15, 1961. This application July 15, 1966, Ser. No. 565,375
Claims priority, application France, Dec. 1, 1960, 845,588, Patent 1,281,414
U.S. Cl. 8—127.6    8 Claims
Int. Cl. D06m 13/08

---

This application is a continuation-in-part of Ser. No. 152,640 filed Nov. 15, 1961, now abandoned.

This invention relates to the reduction of the felting and shrinking of keratinous fibers, particularly wool, during processing and use. In general the tests which revealed the extent of shrinking also revealed the extent of felting, and investigators have concluded that these phenomena are allied, although in some way not fully understood.

Felting involves compression and adhesion of the fibers, which in many fabrics is undesirable and constitutes an imperfection. To reduce felting and shrinking of wool and other keratinous materials the prior art had recourse to chlorination, but finding chlorination not a satisfactory answer to the problems, had later recourse to the use of an N-chlorinated 1-3-5 triazine in aqueous acid solution, which was of limited utility because of poor solubility of the agent, and of its attack on wool fibers at the higher effective concentrations of active chlorine. Also, under strong washing conditions, and long periods of treatment, a wool thus treated still tended to felt. This felting produced serious drawbacks for certain textile articles.

It is possible to increase the resistance of wool to felting by increasing the concentration of active chlorine in acid treating solution, but as a result, the wool degrades to such an extent that it can no longer be used for the manufacture of textile articles. This fact again demonstrates the unsatisfactory nature of treatments based on the concentration of active chlorine in the bath. Chlorination is helpful with grave limitations.

The imperfections of the chlorine treatment having been recognized (e.g. in United States Patent 2,993,747) it has been proposed to use trichloro cyanuric acid, or a mixture of it with dichloro isocyanuric acid (herein called the diacid and triacid) for the reduction of felting and shrinking of wool and other keratinous materials. In such processes the triacid is used in aqueous solution or suspension (usually some suspended matter is present and affects the result unfavorably), the triacid being present in at least 50% by weight when the two are used in the same bath; the process is normally carried out at pH from 0.5 to 3 but may be initiated at neutral pH by buffering. Such processes also have imperfections: e.g. although initiation by buffering is possible the solutions in use rapidly become acid, which is harmful; going from pH 6.5 to 4.5 in 20 minutes. A solution of the diacid at 1.5% of active chlorine at a pH of 2 produces a treated wool which, as a result of washing in a standard washing bath, for 1, 2, and 3 hours, shrinks respectively 3.5, 8.85, and 33%; and a solution of triacid at a pH of 2 produced respective shrinkages of 4.8, 24.8, and 51.2% respectively, all tests being at room temperature and imperfect in yield and result. Furthermore, to increase the concentration to produce a higher chlorine content in the treating bath, for instance 6%, so degrades the wool during treatment as to make it unsuited to many uses. Such processes have substantial losses of chlorine and are relatively unstable. When wool so treated is dyed, the color is frequently not uniform and not of one true shade or hue.

It is an object of this invention to reduce shrinking and felting below the percentages provided by the processes above described. Another object is to prepare solutions which contain greater contents of active chlorine than are permissible with the foregoing processes but are not harmful to the keratinous fiber. Another object is to prepare solutions which are fully operational at neutrality, which act rapidly at room temperatures, but with sufficient deliberation to be controlled. Another object is to prepare solutions which are stable even in concentrated solutions and retain and do not lose their active chlorine. A further object is to prepare antifelting and antishrinking baths which are homogeneous and free of suspended matter, and which do not become acid during use. Another object is to improve the dyeing properties, the retention of dye, and uniformity of color, of shrink-proofed wool.

Among other imperfections of the process which employs the triacid and the diacid or both are the deterioration of the structure of the keratinous fiber, producing a harsh feel, a lack of resiliency, a tendency to stretch, and a viscous, gluey surface. It is an object of the invention to avoid this result and to produce fiber which has a soft feel, and is springy, lively and not viscous.

Yet another imperfection of the treatment of wool with di- and/or trichloro cyanuric acids is the consumption of active chlorine, which will attain 4.24% in 20 minutes when 6% of active chlorine are present in a treating bath of pH 6.5, the weight of fibers to the bath being 1 to 30. It is an object of this invention to produce a better result with less consumption of active chlorine, hence, with better economy.

All processes of treatment produce some degradation of the fiber, but the fiber produced by the process using di- and/or triacid is exceptionally poor in this respect, producing a product about 34% soluble in soda solution when having been treated in a treating bath of pH 6.5 containing 6% of active chlorine, compared to about 20% for the same, untreated fiber. It is an object of this invention to produce a product which is far less degraded, as shown by better resistance to dissolution in soda solution.

The process which employs the triacid with or without the diacid is somewhat violent, too rapid, and it is consequently uncontrollable. If 6% of active chlorine are present in a buffered solution of pH 6.5, about 2.3 of those percent are consumed in the first two minutes, strongly degrading the fiber and rendering it useless for many textile uses. It is an object of this invention to improve the process, slow it down, and obviate the degradation.

In considering this subject it is advisable to distinguish such processes from others which might use similar reagents, but which proceed by different reactions. Chlorine is used for bleaching, but in that reaction the natural coloring matter of a substance, for instance a textile fiber, is destroyed by a process of oxidation and maximum effort is made to see that the fiber itself is not affected. Laundering also employs chlorinating agents for oxidation of the natural coloring matter of a substance and to dissolve or remove dirt by floatation or saponification. In such processes the basic chemical and physical processes are different from shrink and felt proofing.

In the present process, and in all antifelting and antishrinking processes, a wholly different reaction is involved, a reaction with a modification of the macromolecule of keratin. Keratin is the complex organic substance constituting the structure of wool. It may be assumed for the moment that the agent proceeds by complex reactions to break certain disulfide bonds in the molecules of keratin, possibly affixing organic radicals from the agent somewhere in the molecule, and to fix chlorine on certain tyrosine bonds. This reaction has no relationship to chlorination processes of other types; indeed it has been demonstrated that utility in bleaching or laundering does not fit a compound for antishrinking, and vice versa.

A major object of this invention is to provide better reagents for the keratin reaction, and a better keratin reaction.

Other objects are to develop a solution capable of use for more extended periods of time than was permitted by the solutions of the prior art, without harmful degradation of the fiber, with better solubility than that of the prior art compounds, and which maintain higher concentrations of active chlorine without damage. Another object is to avoid the loss of free chlorine which attends the use of the former process.

The objects are accomplished, generally speaking, if keratinic fibers are treated with aqueous solutions of alkali metal salts of N-dichloroisocyanuric acid, represented by the general formula:

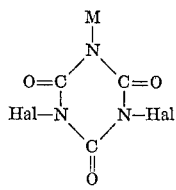

in which M represents an alkali metal and Hal is halogen, preferably Cl. The preferred treatment is carried out at a pH close to neutrality but mild alkalinity is useful although less effective.

When the alkali metal salts of N-dichloroisocyanuric acid are dissolved in water one obtains, directly, solutions of pH's within 6.5 and 7, the exact pH depending on the alkali metal salt chosen and the concentration of salts in the solution, such neutral solutions being best for the treatment of keratinic fibers.

The process of this invention produces textile materials which have an excellent resistance to felting and shrinking without producing any change in color and without damage to the fibers.

The aqueous solutions of the alkali metals of dichloroisocyanuric acid can be used directly, without any other addition, for treating keratinic textile fibers and especially for the treating of articles such as raw wool, combing or carding skeins, yarns, woven fabrics, knitted fabrics, and finished articles.

According to the invention, for the treating of textile materials, aqueous solutions of alkali metal salts of dichloroisocyanuric acid are used in which the concentration is so adjusted that the weight of active chlorine in the bath is between 1 and 10% of the wool to be treated. A content of about 6% is preferred. The ratio by weight of the textile treated to the bath may be on the order of 1 to 30 in many cases. Under such conditions the treatment will require about 20 minutes at room temperature which allows control and completion. Experience shows that only a part of the active chlorine of the solution is consumed in the treatment and that the solution when depleted needs only to be replenished with fresh salts to be utilized again. The active chlorine is furnished by the Cl groups on the ring.

The antifelting treatment is normally followed by a standard bleaching with usual bleaching agents such as hydrogen peroxide or sodium hydrosulfite.

When the textile material is to be dyed in light colors or in pastel shades the treatment described in this invention can be followed by an oxidizing or reducing treatment. The applicants have found that such a bleaching treatment, while it suppresses the slight yellowing of the fiber, further improves the resistance to shrinking of the material treated. This improvement is considerable, as demonstrated in the examples which follow.

According to a variation of the procedure of this invention the treatment of the textile can be carried out at pH's around 8, obtained by the addition of an appropriate alkaline reagent. In this case, the treatment aiming at improving resistance to felting will be advantageously associated with a bleaching treatment.

Whatever may be the concentration or the pH used, the treatment can be carried out at a temperature near to that of room temperature.

The examples which are given below illustrate the invention and its advantages.

The experiments were carried out on the following textile materials:

(a) Yarns of combed wool Nm/4/2/28, Marinos quality, undyed, degreased.

(b) Jersey, of industrial quality 9 stitches per cm. of 10 rows per cm., in combed wool Nm/2/56, undyed, degreased.

To evaluate the felting and shrinking resistance of the various samples, one cuts out squares of 15 x 15 cm. of the treated jersey, or one knits squares of 15 x 15 cm. of the treated wool yarns and impregnates them with the solution. One does the same thing with the jersey or the wool yarns which have not been treated according to this invention. One draws on the samples, squares of 9 x 9 cm. The samples are then washed under rigorously identical conditions and after drying the sizes of the drawn squares are compared to those of the samples which have been washed but not treated by this process. The resistance to felting is represented by the percentage of shrinking expressed in terms of the different in area of the samples before and after treatment when corrected to an area equal to 100 which corresponds to a square of 9 x 9.

The after-treatment washing was increased by increments of hours at the temperature of 40° C. in a washing machine containing a laundry solution made of:

Soap of Marseille _____ g__ 5
Anhydrous sodium carbonate _____ g__ 0.5
Water _____ liter__ 1

The load was 3.5 kilos of textile material to 20 liters of wash solution.

In order to accelerate the felting of the samples, an antifoam silicone derivative was added to the wash solution.

EXAMPLE 1

Some yarns of wool were treated for 20 minutes at room temperature in a solution containing 6% by weight of active chlorine, based on the weight of the fiber, supplied by sodium dichloroisocyanurate; the solution has a stable pH of 6.5 throughout the process. The ratio of treated textile material to the bath was 1/30 by weight.

After the treatment, testing revealed that the proportion of active chlorine consumed was 2/5, and that the bath remained perfectly stable for several days after it had been used. This permitted this bath to be stored and used again after it has been replenished. The excess chlorine of the treated samples was removed by a solution containing 3% of sodium bisulfite of 36° Be.

Table 1 gives the percentage of shrinking observed after increasingly lengthened washing periods.

TABLE 1

| Treatment by— | Shrinking percent after washing periods at 40° C. for— | | | | | |
|---|---|---|---|---|---|---|
| | 1 hour | 2 hours | 3 hours | 4 hours | 5 hours | 6 hours |
| Non-treated reference sample | 9.85 | 41.2 | 52.6 | 59.1 | 59.4 | 60.5 |
| Sample treated as per Example 1 | 0 | 2.58 | 6 | 8.45 | 9.55 | 11 |

Even after a washing period of 6 hours, which are conditions onerous and infrequent, the shrinking remained very small. As shrinkage is taken as the measure of felting, both were greatly improved, compared to that resulting from treatment by a solution of trichloroisocyanuric acid, or of triacid mixed with diacid.

In order to compare these results with those of the trichloroisocyanuric acid process, identical samples were treated according to the process of the identified patent, using its preferred agent trichloroisocyanuric acid, first at the pH recommended by the patentee, and then at an initial pH of 6.5 which was produced by buffering. The baths were made identical in temperature and the first tests were used at the same concentrations of active chlorine, 6%. The relative weight of the keratinous material to the baths was the same, 1/30. Later tests of the trichloroisocyanuric process were carried out at the pH recommended by the patentee and compared with the process of Example 1 hereof. In all tests the processes proper were followed by dechlorination and a rinse. The following results were demonstrated by these tests:

ACTIVE CHLORINE CONSUMED IN PERCENT OF WEIGHT OF THE WOOL

| Time in minutes | 2 | 5 | 20 | 35 |
|---|---|---|---|---|
| From tri-acid solution | 2.3 | 2.65 | 4.24 | |
| From our solution of Example 1 | 0.4 | 1.3 | 2.5 | |

CHANGE OF pH WITH TIME

| Time in minutes | 0 | 2 | 5 | 20 | 35 |
|---|---|---|---|---|---|
| Buffered tri-acid solution | 6.5 | 4.5 | 4.5 | 4.5 | |
| Our solution of Example 1 | 6.5 | | 6.4 | 6.1 | 6.1 |

DEGRADATION TESTS

*Touch.*—The product of the process of our Example 1 had a feel approximating that of the original sample, soft, resilient, and lively. Not affected by moistening.

The product treated with the triacid solution had a harsh feel, not lively, and when moistened tended to stretch and become viscous and sticky.

Solubility in standard NaOH solution as a test of degradation

| | Percent |
|---|---|
| Solubility of the untreated sample | 20.36 |
| Solubility of sample treated by our Example 1 | 25.50 |
| Solubility of sample treated with triacid solution | 34.03 |

DYEING

The samples of our Example 1 and that which was treated by a solution of triacid as above described were dyed with identical baths containing C.I. acid yellow 61, C.I. acid red 118, C.I. acid blue 82 (color index).

The samples treated by our process were dyed a uniform grey of uniform depth.

The samples treated by the solution of triacid as aforesaid took the dye irregularly as to depth and tone, having some parts blue grey, others rose beige, and others orangey.

In buffering the triacid solution to neutrality, borax was used.

Identical tests were carried out at 40° C. for 20 minutes with triacid solution as in the example above, except that buffering was omitted, the pH of the solution was at 2, which is the preferred level of that process, and with a content of 1.5% of free chlorine, also a preferred constitution.

After 1 hour washing in standard soap solution that product shrank 4.8%, after 2 hours it shrank 24.8%, and after 3 hours it shrank 51.2%.

Under like washing conditions the product of this present invention showed no shrinkage after 1 hour of washing, about 2.58% after 2 hours, about 6% after three hours, and only about 8.45% after 4 hours.

EXAMPLE 2

The treatments were carried out in the same manner as in Example 1 but with solutions containing 9% of active chlorine based on the weight of the fiber. One notices that 3/10 of the active chlorine employed has been consumed. After this treatment the material is either dechlorinated with bisulfite or bleached by such standard reagents as hydrogen peroxide or sodium hydrosulfite.

The Table 2, below, gives the percentages of shrinkage observed after increasingly lengthened washing periods.

TABLE 2

| Treatment by— | Bleaching | Shrinking percent after washing periods of— | | | | |
|---|---|---|---|---|---|---|
| | | 2 hours | 3 hours | 4 hours | 5 hours | 6 hours |
| Non-treated reference sample | None | 11.5 | 47.25 | 57.75 | 58.6 | 60.6 |
| Sodium dichloro-cyanurate (9% of active chlorine) | do | 2 | 3.8 | 8.2 | 8.4 | 14.1 |
| Idem | $H_2O_2$ | 3.8 | 6.1 | 6.1 | 6.1 | 10 |
| Do | Hydrosulfite | 3.5 | 4.9 | 4.9 | 4.9 | 6.05 |

This table shows, again, the excellent protection against shrinking and felting which can be obtained by these treatments. Furthermore, one notices the beneficial influence which the bleaching, carried out with hydrogen or hydrosulfite, has on the magnitude of the felting, especially after long washing periods.

EXAMPLE 3

The same treatment as those described in Examples 1 and 2 was applied to a jersey such as defined above. After the treatment, one follows with either a dechlorination using bisulfite or a bleaching by means of hydrogen peroxide. As in the previous experiments described in Examples 1 and 2, one notices that in the baths containing 6 and 9% of active chlorine, the actual consumptions were, respectively, 2/5 and 3/10 of the quantity originally dissolved.

The Table 3, below, gives the percentage of shrinking observed after increasingly lengthened washing periods.

TABLE 3

| Treatment by— | | | Shrinking percent after washing periods of— | | | | |
|---|---|---|---|---|---|---|---|
| Material used | Active chlorine | Bleaching | 2 hours | 3 hours | 4 hours | 5 hours | 6 hours |
| Non-treated reference sample | | | 10.2 | 13.8 | 17 | 41 | 57 |
| Sodium dichlorocyanurate | 6% | | 1.5 | 2.5 | 2.7 | 8.5 | 30.5 |
| Idem | 6% | H₂O₂ | 0 | 0 | 0 | 4.5 | 19.5 |
| Do | 9% | | 1.5 | 1.5 | 2.7 | 3.9 | 22 |
| Do | 9% | H₂O₂ | 0 | 0 | 0 | 0.4 | 1.95 |

A study of this table leads to the same conclusions as those previously reached. One notices again the considerable improvement obtained over the longer washing periods.

EXAMPLE 4

One treats, for 20 minutes at room temperature, yarns of combed wool, such as those defined above, with solutions of sodium dichloroisocyanurate containing 6 to 9% by weight of active chlorine based on the weight of fiber, the pH being raised to 8.5 by the addition of caustic soda. The ratio of fibers/bath is 1/30 by weight.

One notices that about 1/3 of the active chlorine employed has been consumed in the treatment and that after removal of the fibers, the bath remains perfectly stable. This permits the reuse of this bath after it has been replenished.

After the treatment, the samples are dechlorinated by means of a solution containing 3% of bisulfite at 36° Be.

Table 4, below, gives the percentage of shrinking observed after increasingly lengthened washing periods.

easy, and is not accompanied by that loss of active chlorine which happens during the solution of the corresponding free acids.

The use of alkali metal salts of N-dichloroisocyanuric acid present, when compared to the prior art, a great advantage because the solubility of the alkali salts of dichloroisocyanuric acid allows the direct preparation of treating solutions with the desired chlorine concentration, avoids loss of chlorine, and exhausts better.

Another advantage is that in our process only about two-fifths of the active chlorine is consumed in the process, which permits the use of 6% concentrations of active chlorine without degrading the wool. No other process is capable of using such concentrations without severe degradation of the wool. This advantage could not have been foreseen. Another advantage is the controllability of the process, which proceeds with deliberate speed, not with destructive rapidity. Another advantage is that the novel baths of this invention are always in solution, not in suspension. Another advantage is that the antifelting and antishrinking treatment of this invention, excellent

TABLE 4

| Treatment by— | | Shrinking percent after washing periods of— | | | | |
|---|---|---|---|---|---|---|
| Material used | Active chlorine | 2 hours | 3 hours | 4 hours | 5 hours | 6 hours |
| Non-treated reference sample | | 41.2 | 52.6 | 59.1 | 59.4 | 66.5 |
| Sodium dichloro-isocyanurate | 6% | 5.68 | 22.7 | 31.6 | 30.8 | 41 |
| Idem | 9% | 4.55 | 13 | 17.5 | 19.8 | 27.5 |

It was observed, under these basic conditions, that the resistance to shrinking, while being much superior to the prior art was, nevertheless, inferior to that obtained at pH 6.5, and that a relatively strong yellowing of the material occurred.

EXAMPLE 5

A treatment similar to those described in Example 4 was applied to a jersey such as the one defined above. After the treatment, one proceeded either to a dechlorination with bisulfite, or to a classical bleaching with hydrogen peroxide. As in the previous experiments, described in Example 4, it was observed that about 1/3 of the active chlorine employed had been consumed in the treatment. Table 5, below, gives the percentage of shrinking observed after increasingly lengthened washing periods.

An examination of this table leads to the same conclusions previously reached.

in themselves, are yet further improved by bleaching with usual bleaching agents of the types used on wool.

Another advantage of the invention is that keratinous material, especially fibers, can be treated against felting and shrinking in baths having abnormally high contents of active chlorine without fear of losing substantial quantities of the chlorine. Another advantage is the stability of the new baths during the treatment and during storage, stabilities never previously attained. Because of the stability of our baths containing low or high contents of active chlorine, it is possible to use more concentrated solutions, which entrains economies in process, in overall time, and in apparatus. Because of the intrinsic stability of the novel baths, a used bath, partly exhausted, can be enriched by the addition of salts and put back into use, which was not practical with prior solutions; these solutions are of uniform constitution and great homogeneity,

TABLE 5

| Treatment by— | | | Shrinking percent after washing periods of— | | | | |
|---|---|---|---|---|---|---|---|
| Material used | Active chlorine | Bleaching | 2 hours | 3 hours | 4 hours | 5 hours | 6 hours |
| Non-treated reference sample | | | 10.2 | 13.8 | 17 | 41 | 57 |
| Sodium dichloroisocyanurate | 6% | | 6.5 | 6.5 | 6.5 | 18.4 | 36.4 |
| Idem | 6% | H₂O₂ | 1.2 | 2.3 | 2.3 | 7.4 | 22 |
| Do | 9% | | 3.8 | 4.25 | 5 | 15.5 | 35 |
| Do | 9% | H₂O₂ | 1.2 | 1.6 | 1.6 | 4.8 | 21 |

Other halogens, for instance Br, may be substituted for Cl in the compound but Cl is preferred.

The alkali metal salts of dichloroisocyanuric acid have the advantage, when compared to chloroisocyanuric acids, to be more readily soluble. Their excellent solubility in aqueous media renders the preparation of the treating bath being in these regards superior to anything which had heretofore been known.

A substantial advantage in industrial use is that in preparing the baths of this invention solutions, called mother liquors, are prepared which are more concentrated than those which are used in the actual process, and which are diluted just before use. This practice is not possible with solutions of prior reagents such as triacid, especially because, even when very dilute, they are unstable to the extent that a solution of trichloro cyanuric acid having a concentration of 2 g./l. of active chlorine will have a loss of 3.5% of its chlorine in 15 minutes. Buffering does not solve the problem for the triacid solutions. The triacid solution, when buffered to 6.5 pH by the addition of pyrophosphate, lost 15% of its chlorine in an hour, whereas our solution with the same pH lost none of its chlorine.

Another advantage is that keratin is affected more in alkaline or acid solution than at neutrality, that the applicants' solutions are self-stabilized at neutrality, and that triacid solutions will not remain neutral even when initially buffered to a pH of 6.5.

Another advantage is that solutions of the present invention can be prepared and satisfactorily used at concentrations up to 140 g./l. of active chlorine, whereas in the tri- and diacid systems, even when buffered with pyrophosphate and borax it is impossible to obtain solutions having a concentration of active chlorine above 80 g./l. and usually closer to 66 as a maximum. This demonstrates another fact, that the baths have different structure and that buffering does not produce a bath equivalent to our invention.

Other advantages which have been demonstrated are that the di- and triacids, whether used alone or in mixture, are difficult to work with in the plant. They require heating and cooling and, even so, are usually unable to produce a homogeneous solution free of suspended matter.

Other advantages are the accomplishment of each of the objects of the invention.

As many apparently widely different embodiments of the present invention may be made without departing from the spirit and scope thereof, it is to be understood that the invention is not limited to the specific embodiments.

What is claimed is:

1. A method of preventing the felting and shrinking of keratinous fibers which comprises immersing the fibers in an aqueous solution of the compound

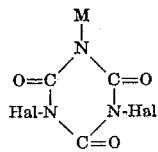

in which M is an alkali metal, Hal is halogen, and the aqueous solution is at substantially neutral pH.

2. A method according to claim 1 in which the fibers are degreased before immersion, M is sodium and Hal is chlorine.

3. The method of claim 1 in which Hal is chlorine and in which the treated fibers are dechlorinated after having been treated.

4. A method according to claim 1 in which the concentration of active chlorine in the bath is about 6% of the weight of the fibers in the bath.

5. The method of claim 1 in which the Hal is chlorine, the proportion of active chlorine to fibers by weight being between about 1 and 10 parts per hundred, the weight of fibers to the weight of the bath is about 1 to 30 and the fibers are dechlorinated after treatment.

6. A method of preventing the felting and shrinking of keratinous material which comprises immersing the material in an aqueous solution of the compound

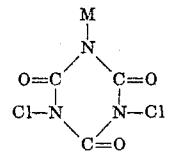

in which M is sodium, the pH is neutral and preferably circa 6–6.5, at room temperature, the concentration of active chlorine being about 6% by weight of the material, the time of immersion is circa 20 minutes, dechlorinating the material and rinsing and drying the material.

7. In a process of treating keratinous fibers to reduce shrinking and felting the improvement which comprises impregnating the fibers with an aqueous solution containing between about 1 and about 10% of active chlorine by weight of the fibers, of a compound having the formula

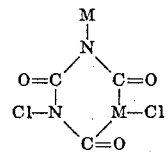

in which M is an alkali metal and Cl is chlorine, at about neutral pH and atmospheric temperature, and dechlorinating the fibers.

8. The method of protecting keratinous fibrous materials from shrinking and felting, comprising, immersing said material in an aqueous solution of sodium dichlorocyanurate containing from 6 to 9% of active chlorine by weight, based on the weight of the material contacted, and at a pH of close to neutrality and preferably about 6.5 to 8.5, and substantially ambient air temperature, for a period of about 20 minutes.

References Cited

UNITED STATES PATENTS

| | | | |
|---|---|---|---|
| 2,993,747 | 7/1961 | Scott | 8—127.6 |
| 3,071,431 | 1/1963 | Mertens et al. | 8—128 |
| 3,144,300 | 8/1964 | Cosnard et al. | 8—127.6 |

FOREIGN PATENTS 219,930   1/1959   Australia.

NORMAN G. TORCHIN, *Primary Examiner.*

J. CANNON, *Assistant Examiner.*

U.S. Cl. X.R.

8—128, 108